(12) United States Patent
Graham et al.

(10) Patent No.: US 6,726,610 B2
(45) Date of Patent: Apr. 27, 2004

(54) C-FRAME ASSEMBLY APPARATUS AND METHOD FOR LARGE PANEL-SHAPED WORKPIECES

(75) Inventors: Craig William Graham, Renton, WA (US); Timothy Donaldson Quinn, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/256,956

(22) Filed: Sep. 27, 2002

(65) Prior Publication Data

US 2003/0024094 A1 Feb. 6, 2003

Related U.S. Application Data

(63) Continuation of application No. 09/506,820, filed on Feb. 18, 2000, now Pat. No. 6,478,722.

(51) Int. Cl.⁷ .............................. B21J 15/10; B21J 15/14
(52) U.S. Cl. .................. 483/28; 29/34 B; 29/243.53; 29/33 K
(58) Field of Search .................. 29/33 K, 34 B, 29/243.53, 524.1, 525.06, 464, 33 P, 563; 483/28–29; 100/918; 227/111

(56) References Cited

U.S. PATENT DOCUMENTS

| 3,154,979 | A | | 11/1964 | Crispin |
| 4,203,204 | A | | 5/1980 | Murphy |
| 4,310,964 | A | * | 1/1982 | Murphy .................. 29/525.06 |
| 4,582,238 | A | | 4/1986 | Bennett et al. |
| 4,596,066 | A | | 6/1986 | Inoue |
| 4,620,656 | A | * | 11/1986 | McClay et al. ................ 227/5 |
| 4,720,897 | A | | 1/1988 | Orrell et al. |
| 4,780,952 | A | | 11/1988 | Babel et al. |
| 4,864,702 | A | | 9/1989 | Speller, Sr. et al. |
| 4,885,836 | A | | 12/1989 | Bonomi et al. |
| 4,951,849 | A | | 8/1990 | Townsend et al. |
| 4,955,119 | A | | 9/1990 | Bonomi et al. |
| 4,967,947 | A | | 11/1990 | Sarh |
| 5,033,174 | A | | 7/1991 | Zieve |
| 5,060,362 | A | | 10/1991 | Birke et al. |
| 5,105,515 | A | | 4/1992 | Nelson |
| 5,222,289 | A | | 6/1993 | Michalewski et al. |
| 5,231,747 | A | | 8/1993 | Clark et al. |
| 5,242,359 | A | | 9/1993 | Obrist |
| 5,466,207 | A | | 11/1995 | Arens |
| 5,555,616 | A | | 9/1996 | Michalewski et al. |
| 5,615,474 | A | | 4/1997 | Kellner et al. |
| 5,619,913 | A | | 4/1997 | Padovani |
| 5,699,599 | A | | 12/1997 | Zieve |
| 5,755,653 | A | | 5/1998 | Nishida |
| 5,771,551 | A | * | 6/1998 | Schurter et al. .......... 29/243.54 |
| 5,860,900 | A | | 1/1999 | Dunning et al. |
| 5,920,974 | A | * | 7/1999 | Bullen ........................ 29/33 K |
| 6,430,796 | B1 | * | 8/2002 | Jones et al. ............... 29/243.53 |
| 6,467,826 | B2 | * | 10/2002 | Stromberg et al. .......... 294/86.4 |
| 6,478,722 | B1 | * | 11/2002 | Graham et al. .............. 29/34 B |

FOREIGN PATENT DOCUMENTS

DE  3414889 A  10/1985

\* cited by examiner

*Primary Examiner*—Erica Cadugan
(74) *Attorney, Agent, or Firm*—Alston & Bird LLP

(57) ABSTRACT

An assembly apparatus for aircraft wing panels and the like includes one or more positioners movable along a bed above which the panel is supported, each positioner carrying a tool-supporting frame on which assembly tools are mounted for performing assembly operations on the panel. The tool-supporting frame is releasable from the positioner, and the apparatus includes a frame changer that travels to the positioner, removes the tool-supporting frame, installs a replacement frame into the positioner, and carries the removed frame to a remote service station where servicing operations are performed on the frame.

9 Claims, 6 Drawing Sheets

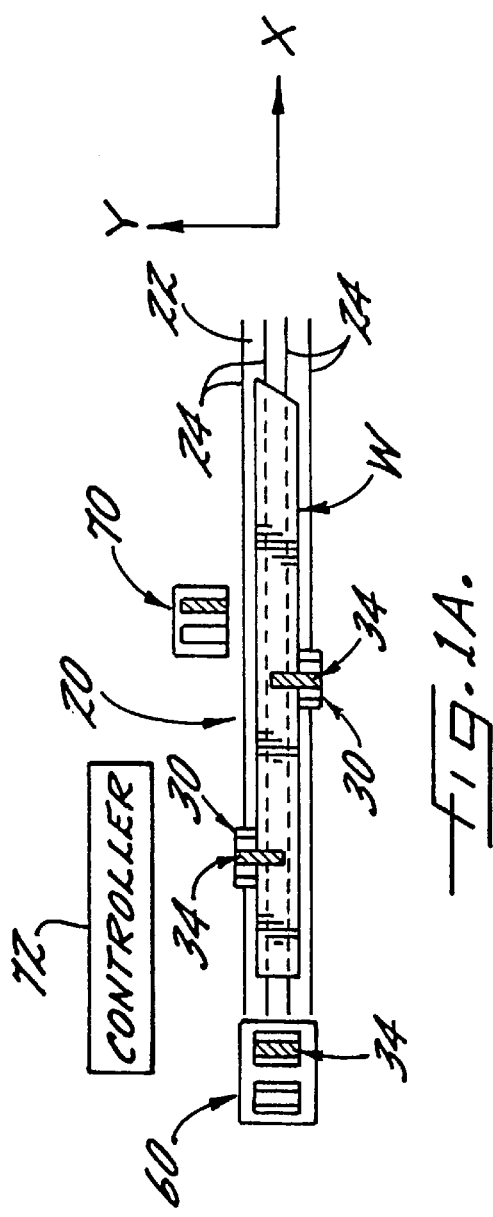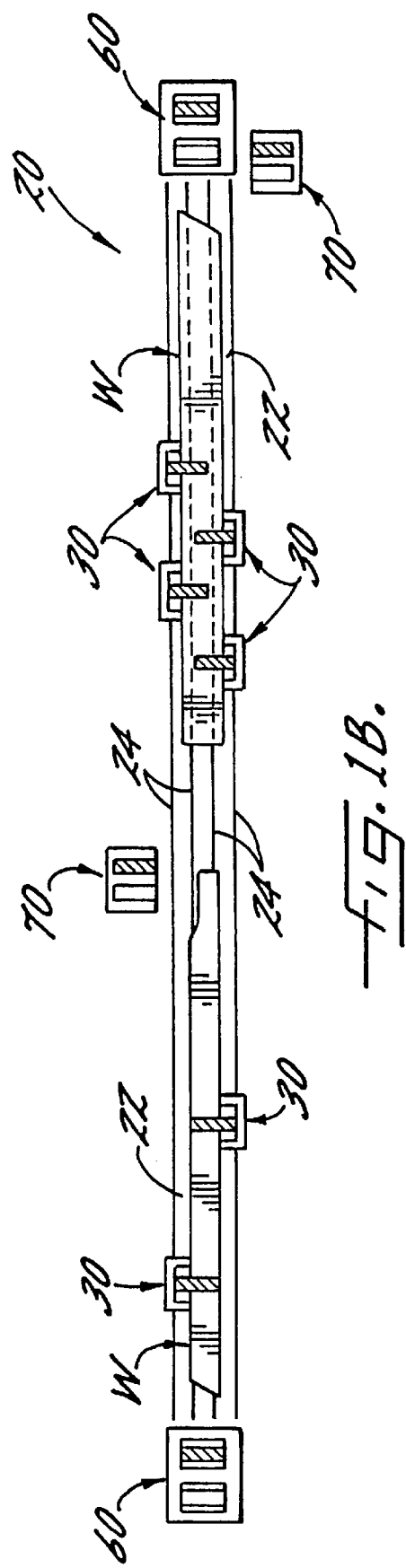

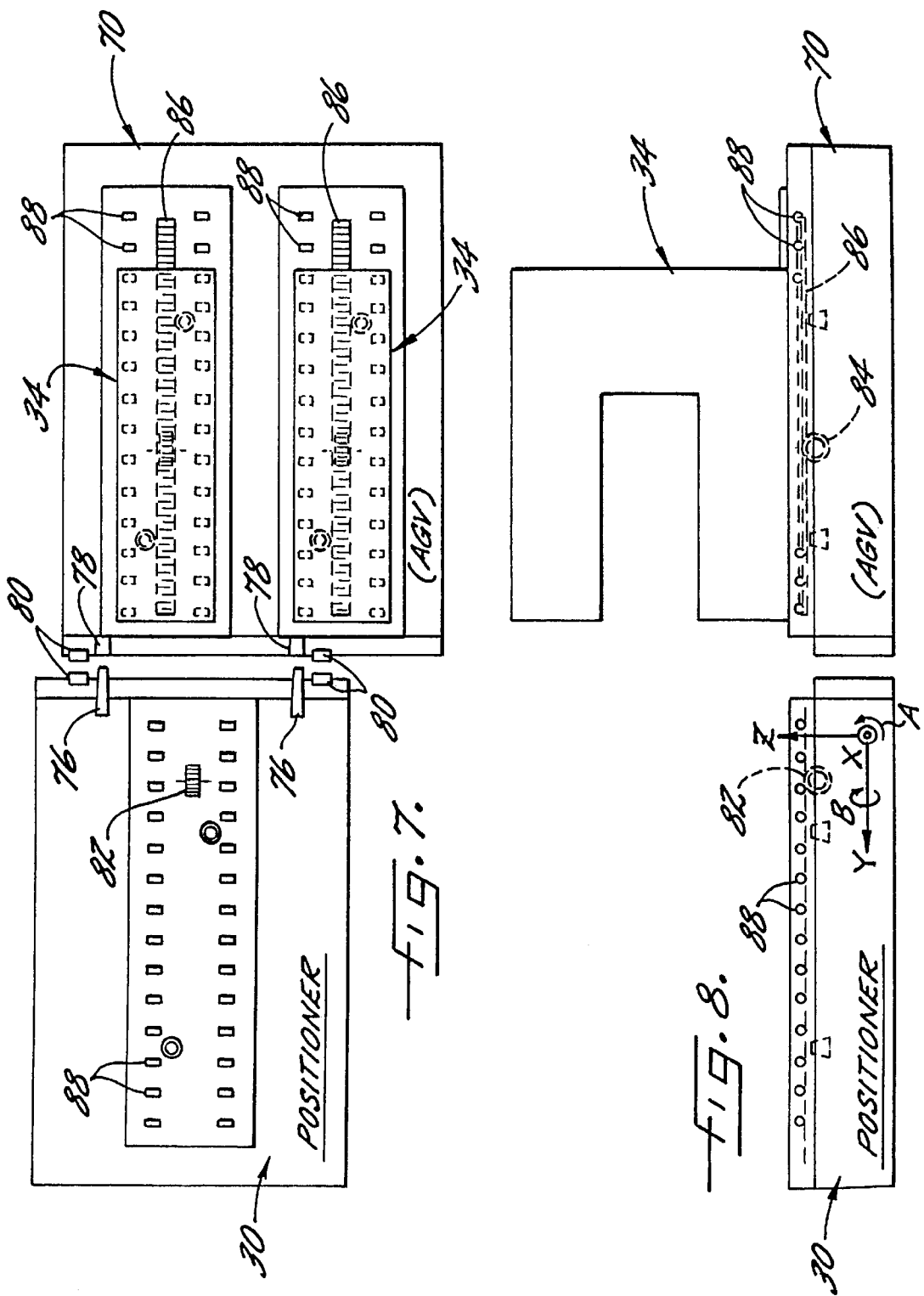

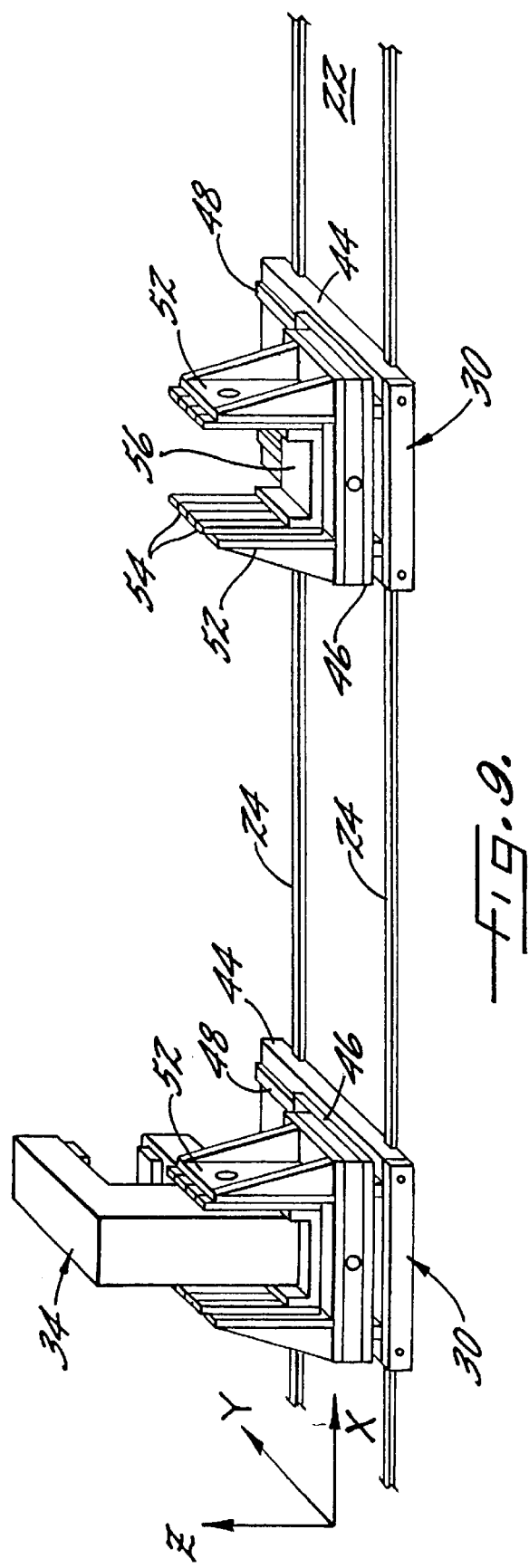

C-FRAME ASSEMBLY APPARATUS AND METHOD FOR LARGE PANEL-SHAPED WORKPIECES

CROSS-REFERENCE TO RELATED APPLICATION

This application is a continuation of U.S. patent application Ser. No. 09/506,820 filed Feb. 18, 2000, now U.S. Pat. No. 6,478,722, which is incorporated herein by reference.

FIELD OF THE INVENTION

The invention relates to apparatus and methods for performing automated assembly operations such as riveting, tacking, or the like, on large panel-shaped workpieces, using positioners that manipulate tool-supporting yokes or frames on which assembly tools are supported.

BACKGROUND OF THE INVENTION

Large panel-shaped structures used in the construction of airframes commonly have reinforcing members, usually called stringers, attached to outer skins so as to form strong yet lightweight panels. The stringers are usually affixed to the skins by riveting. In a commonly used assembly technique, opposed riveting tools are positioned by two spaced legs of a yoke or C-frame such that the tools are on opposite sides of a workpiece. The C-frame is carried by a multi-axis positioner, which moves the C-frame along the workpiece for riveting at various locations of the workpiece. Typically, the C-frame can be positioned adjacent only one edge of the workpiece, and the legs of the C-frame are used to reach widthwise across the workpiece. In this type of assembly apparatus, if riveting is to be done near the opposite edge of the workpiece, the throat of the C-frame must have a depth about equal to the maximum width of the widest workpiece that is to be processed in the apparatus. Consequently, the C-frame becomes large and heavy. Because the C-frame has a high mass and inertia, the foundation and traversing mechanism that support and move the positioner on which the C-frame is carried must be made very substantial. Accordingly, the overall cost of the assembly apparatus is relatively high. The high inertia of the C-frame and positioner also means that the maximum acceleration of the positioner is relatively low, and thus the apparatus is slow.

As an alternative to sizing the C-frame large enough to reach across the full width of the workpiece, the C-frame positioner can be movable so that it can be positioned at either edge of the workpiece, or the workpiece can be turned 180° so that each edge of the workpiece can be positioned adjacent the C-frame. The former possibility necessitates a significantly more complicated positioning system, and the latter possibility is cumbersome and inefficient, particularly where very large workpieces, such as wing panels or the like, are being processed.

A further drawback associated with C-frame type assembly machines, and other types of assembly machines using positioners for manipulating tool-supporting frames (whether C-shaped or of other shapes) that support assembly tooling, is that when the tool-supporting frame and/or its associated assembly tooling require maintenance or tool changes, the frame and its positioner must generally be positioned in a location near the workpiece, and this prevents other positioners from accessing the area of the workpiece near the inactive frame to continue the assembly operations. This same problem also affects gantry-type machines and other types of frame-based machines. Thus, while maintenance or tool changes are being performed, the utilization rate for the assembly cell drops significantly.

SUMMARY OF THE INVENTION

The above needs are met and other advantages are achieved by the present invention, which provides assembly apparatus and methods that, in a first aspect of the invention, enable the entire area of a panel-shaped workpiece to be accessed by assembly tooling while avoiding the necessity of using large and heavy C-frames.

To this end, an assembly apparatus in accordance with a preferred embodiment of the invention includes a bed defining a support surface extending along orthogonal X- and Y-axes, and workpiece supports adapted to support a workpiece in a position spaced from the support surface with opposite first and second longitudinal edges of the workpiece extending generally parallel to the X-axis and a width of the workpiece extending generally parallel to the Y-axis. The apparatus also includes at least first and second positioners each supporting and positioning a C-frame having a pair of spaced legs adapted to support tooling for operating upon the workpiece when the workpiece is positioned between the legs. Each positioner comprises a platform operable to travel along the support surface of the bed in a direction parallel to the X-axis and a carriage on which the respective C-frame is mounted and which is supported on the platform so as to be movable relative thereto. The first positioner is arranged to carry its respective C-frame adjacent the first longitudinal edge of the workpiece such that free ends of the legs extend toward the opposite second longitudinal edge of the workpiece. The second positioner is arranged to carry its respective C-frame adjacent the second longitudinal edge of the workpiece such that free ends of the legs extend toward the first longitudinal edge of the workpiece. The legs of each C-frame have sufficient length to carry the tooling across at least about half of a maximum width of the workpiece, and the carriages are movable generally away from each other on the respective platforms to enable the positioners to pass by each other as they travel along the bed parallel to the X-axis. Thus, each positioner can access the entire length of the workpiece with interference from the opposite positioner. Because each C-frame need be no longer than necessary to reach halfway across the workpiece, each positioner and C-frame can be made relatively lightweight and, therefore, can be moved relatively quickly from one position to another.

In another aspect of the invention, apparatus and methods are provided enabling improved utilization rate of an assembly cell by allowing maintenance and/or tooling changes to be made to a tool-supporting frame in a location remote from the associated positioner, so that the positioner can be used with a replacement tool-supporting frame while the original tool-supporting frame is being serviced. To these ends, an apparatus in accordance with a preferred embodiment of the invention comprises a bed defining a support surface extending along orthogonal X- and Y-axes, and workpiece supports adapted to support a workpiece in a position spaced from the support surface with opposite first and second longitudinal edges of the workpiece extending generally parallel to the X-axis and a width of the workpiece extending generally parallel to the Y-axis. The apparatus also includes a first positioner supporting and positioning a tool-supporting frame that supports tooling for operating upon the workpiece. The first positioner comprises a platform operable to travel along the support surface of the bed in a direction parallel to the X-axis and a carriage on which the tool-supporting frame is mounted and which is supported on the platform so as to be movable relative thereto. The tool-supporting frame is releasably mounted on the carriage such that the tool-supporting frame can be removed and replaced. The apparatus further includes at least one additional replacement tool-supporting frame, a service station proximate the bed for storing tool-supporting frames and for performing work operations thereon, and a frame changer operable to remove the tool-supporting frame from the carriage, transport the replacement tool-supporting frame from the service station to the carriage and install the replacement tool-supporting frame into the carriage, and transport the removed tool-supporting frame to the service station such that work can be performed thereon.

The frame changer advantageously comprises a ground vehicle operable to travel to the service station and pick up the replacement tool-supporting frame, travel to a position proximate the positioner having the tool-supporting frame to be replaced, remove the tool-supporting frame from the carriage of the positioner, install the replacement tool-supporting frame into the carriage, travel back to the service station, and unload the replaced tool-supporting frame at the service station. The vehicle can be guided in its movements by any suitable position sensors and a controller.

Preferably, the assembly apparatus includes at least a second positioner supporting a carriage and a tool-supporting frame releasably retained in the carriage, whereby the second positioner can continue to perform work operations on the workpiece while the frame changer is removing and replacing the tool-supporting frame on the first positioner, and vice versa. The first and second positioners are arranged to carry the respective tool-supporting frames along opposite sides of the workpiece, and are preferably configured so they can pass each other as they travel in the lengthwise direction of the workpiece. Depending on the size of the workpiece, it may be advantageous to employ more than one positioner on a given side of the workpiece. Regardless of the number of positioners used, the invention enables improved efficiency and utilization rate by allowing service to be performed on the tool-supporting frames in an "off-line" fashion so that positioners are not tied up while the servicing is being performed.

The invention also provides a method for performing assembly operations on panel-shaped workpieces. A preferred method of the invention comprises engaging the workpiece with tooling members supported on a first tool-supporting frame so as to perform assembly operations on the workpiece; moving the first tool-supporting frame relative to the workpiece by a positioner, the positioner releasably supporting the first tool-supporting frame and being operable to travel along the bed to move the first tool-supporting frame lengthwise along the workpiece such that assembly operations are performed at a plurality of locations on the workpiece; taking the first tool-supporting frame out of action so that service can be performed thereon, by moving a frame changer into a position adjacent the positioner, activating a transfer mechanism to cause the first tool-supporting frame to be released from the positioner and to be transferred onto the frame changer and to cause a second tool-supporting frame to be transferred from the frame changer and to be installed into the positioner; moving the frame changer from the position adjacent the positioner to a service station remote therefrom, and transferring the first tool-supporting frame from the frame changer to the service station; and performing service operations on the first tool-supporting frame at the service station. Accordingly, service operations on the first tool-supporting frame and assembly operations on the workpiece with the second tool-supporting frame can be simultaneously performed.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIGS. 1A and 1B are top elevations schematically depicting two different assembly apparatus and cell layouts in accordance with preferred embodiments of the invention;

FIG. 7 is a top elevation of the positioner and frame changer, showing the position sensors and docking members for aligning and docking the frame changer with the positioner;

FIG. 8 is an end elevation of the positioner and frame changer, showing the transfer mechanism for transferring C-frames between the positioner and the frame changer;

FIG. 9 is a perspective view showing a pair of positioners mounted on rails, one positioner having a C-frame installed therein and the other positioner having had the C-frame removed therefrom.

DETAILED DESCRIPTION OF THE DRAWINGS

Figure 2A:
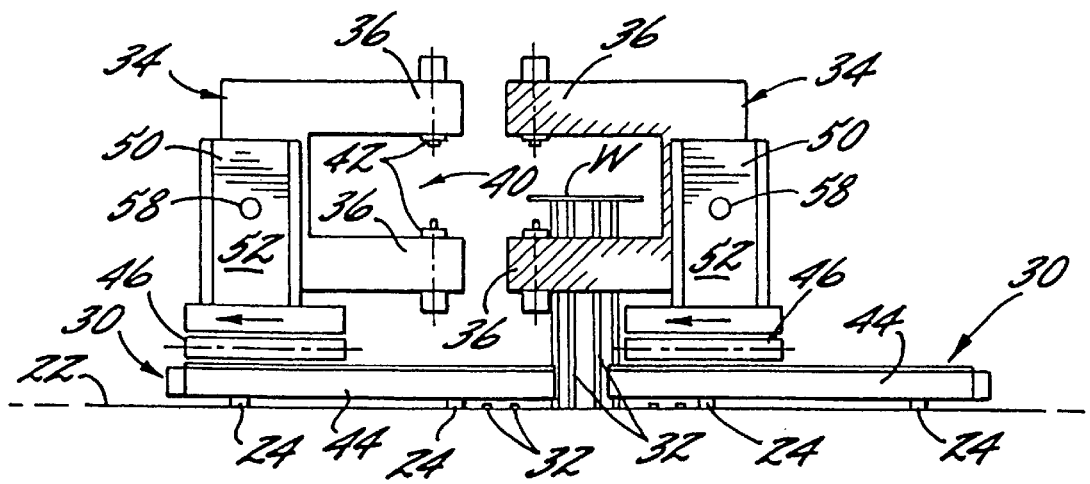
FIGS. 2A and 2B are end elevations of an assembly apparatus in accordance with a further preferred embodiment of the invention, showing the positioners in a first position and in a second position operating upon a relatively narrow workpiece.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1A, a top plan view of an assembly apparatus and cell layout in accordance with one preferred embodiment of the invention is broadly designated by reference numeral 20, and end views of the apparatus are depicted in FIGS. 2A–B and 3A–B. The apparatus 20 includes a bed 22 for supporting workpieces and the other components of the apparatus as described below. The bed 22 generally comprises a rigid foundation with a substantially planar upper surface, and typically is integrated into a floor of a building housing the assembly apparatus 20. The bed 22 supports on its upper surface a plurality of horizontal rails 24. The rails 24 are arranged spaced apart and parallel to one another along a lengthwise direction of the bed, which is defined herein as the X-axis direction. The rails 24 are depicted as being linear, but the invention is not limited to assembly cells having linear rails; thus, the rails may be curved, if desired, which may be advantageous for the assembly of workpieces that are not generally straight.

The apparatus 20 includes one or more positioners 30 that are operable to travel along the rails 24. More particularly, a first pair of adjacent rails 24 define a first track along which a first positioner 30 travels. A second pair of adjacent rails 24 define a second track along which a second positioner 30 travels. The first and second pairs of rails 24 are spaced apart from each other in the direction of a horizontal Y-axis that is orthogonal to the X-axis.

Figure 2B:
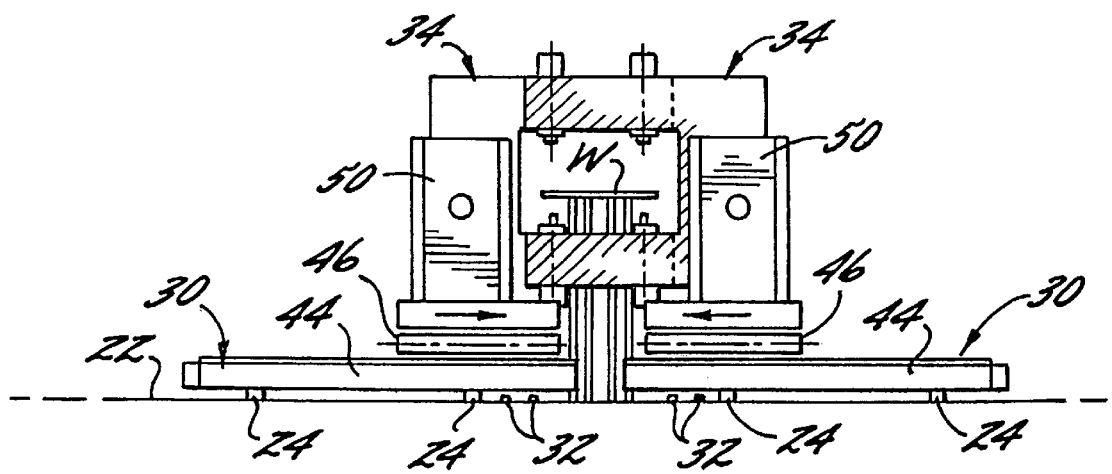

The apparatus 20 further includes supports 32 (FIGS. 2A–B and 3A–B) for supporting a workpiece W, such as a wing panel, spaced vertically above the upper surface of the bed 22 in a generally horizontal orientation. It will be recognized, of course, that the workpiece W may have some curvature in a vertical plane that extends along the X-axis direction; similarly, the workpiece may have some curvature in a vertical plane that extends along the Y-axis direction. In a wing panel, the former type of curvature is generally referred to as curvature in the dihedral sense; the latter type of curvature gives the wing panel its characteristic airfoil contour in the flow direction. However, in general most wing panels are relatively straight in their lengthwise directions, and would be mounted in the assembly apparatus 20 with their lengthwise directions generally horizontal and parallel to the upper surface of the bed and extending generally parallel to the X-axis. The workpiece supports 32 may comprise any suitable support members having the capability of supporting the workpiece W in a generally fixed position and allowing the positioners 30 to travel along the bed 22 in the X-axis direction. For example, the workpiece supports 32 may comprise programmable pogos that can be extended and retracted in the vertical direction and can independently be positioned at variable heights so as to collectively match a lower surface contour of the workpiece W. In FIGS. 2A and 2B, it can be seen that some of the workpiece supports 32 are in retracted positions such that their upper ends are below the positioners 30. A plurality of workpiece supports 32 are spaced apart along the bed 22 in the X-axis direction. As a positioner 30 travels along the rails 24 in the X-axis direction, the supports 32 immediately ahead of the positioner are retracted to allow the positioner to pass over them. Once the positioner 30 has passed the positions occupied by the retracted supports 32, these supports are then extended back upward to engage and support the workpiece W. An example of a workpiece support system of this general type is described in U.S. Pat. No. 4,864,702, incorporated herein by reference.

The apparatus 20 preferably includes at least one positioner 30 on each of the opposite edges of the workpiece W, as shown in FIGS. 1A–B, 2A–B, and 3A–B. Each positioner 30 carries a yoke or C-frame 34 comprising a generally C-shaped structure having a pair of spaced opposing legs 36 joined to an intermediate member 38 that extends generally perpendicular to the legs. The legs 36 define a throat 40 therebetween into which the workpiece can extend in a generally edgewise direction, such that one leg 36 is disposed above the workpiece W and the other leg 36 is disposed below the workpiece W, as best seen in FIGS. 2A–B and 3A–B. The positioners 30 are capable of manipulating the C-frames 34 to move them into various positions having the workpiece W extending into the throats 40 to greater or lesser degrees, such that cooperative tooling members 42 mounted near the free ends of the legs 36 can be positioned at variable distances inward of the opposite longitudinal edges of the workpiece. The tooling members 42 may comprise, for example, riveters for riveting the workpiece to attach a component part thereto, tackers for tacking a component part to the workpiece, fastener installation devices for installing two-part fasteners to affix a component part to the workpiece, or other types of tools. Where riveting is to be performed, low-voltage electromagnetic riveters (LVEMR) can be particularly advantageous in that they require relatively low loads in the rivet axis direction, such that the C-frame does not have to be made massive for reacting the riveting loads without substantial deflection.

Preferably, each positioner 30 includes a platform 44 that is mounted on the rails 24 for movement therealong. A carriage 46 is movably mounted on the platform 44. Advantageously, the carriage 46 is movable back and forth on the platform 44 in the Y-axis direction, as can be seen by comparing FIG. 2A with FIG. 2B, wherein the positioner 30 on the left is shown with its carriage 46 in a retracted position in FIG. 2A, and in an extended position in FIG. 2B. The carriage 46 can be mounted on rails 48 (FIG. 9) affixed to the upper surface of the platform 44. Thus, by extending or retracting the carriage 46, the tooling 42 can be positioned at various locations along the workpiece W in the Y-axis direction. By moving the entire positioner 30 along the rails 24 on the bed 22, the tooling can be positioned at various locations along the workpiece in the X-axis direction.

The positioner 30 preferably also enables the C-frame 34 to be moved along a Z-axis that extends vertically, orthogonal to the X- and Y-axes. To this end, the positioner includes an elevator assembly 50 mounted on the carriage 46. The elevator assembly 50 engages the C-frame to hold the C-frame therein. As best seen in FIG. 9, the elevator assembly 50 comprises a generally U-shaped structure having a pair of spaced upstanding walls 52 oriented generally parallel to the Y-axis. On the inner surfaces of the walls 52 that face each other are mounted vertical rails 54. A slide 56 is mounted on the rails 54 such that it can be moved upward and downward therealong. The slide 56 supports the C-frame 34 and, therefore, the C-frame can be moved along the vertical Z-axis. Advantageously, the structure providing the rails 54 is mounted to the walls 52 on pivots 58 such that the slide 56 and the C-frame are pivotal about a horizontal axis that extends parallel to the X-axis; this rotation axis is referred to herein as the A-axis. This rotational ability is useful for maintaining the axes of the tooling 42 normal to the surfaces of the workpiece W when the workpiece has curvature in the Y-axis (i.e., widthwise) direction.

Some workpieces may have curvature in the X-axis (i.e., lengthwise) direction; for example, as noted above, a wing panel may have curvature in the dihedral sense. In order to maintain the axes of the tooling 42 normal to the surfaces of such a workpiece, the carriage 46 advantageously is rotatable relative to the platform 44 about a horizontal axis that extends parallel to the Y-axis; this rotation axis is referred to herein as the B-axis.

It will be recognized, of course, that the mechanism illustrated herein for achieving movement of the tooling along X, Y, and Z axes and rotation about A and B axes is only one possible such mechanism. Those of ordinary skill in the art will readily comprehend other devices that could be used to achieve the same purposes. For example, a Stewart platform (i.e., three or more independently operable cylinders) could be used between the positioner 30 and the carriage 46 for providing movement along the Z axis and rotation about the A or B axes. Another way to achieve rotation about the A axis is to arrange the tooling so that it travels along curved ways in the C-frame legs.

Figure 3A:
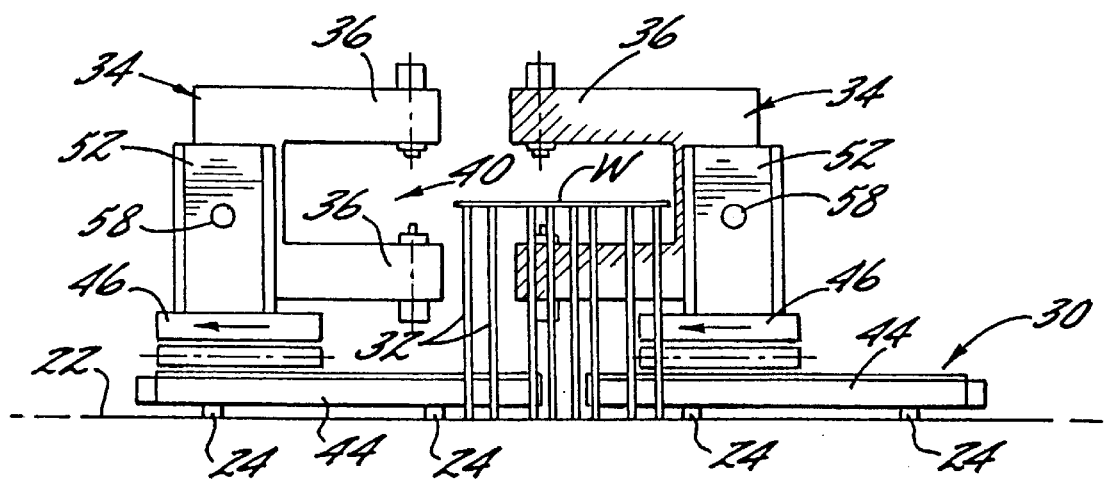
FIGS. 3A and 3B are end elevations of the assembly apparatus of FIGS. 7A and 7B, showing the apparatus operating upon a relatively wide workpiece.
Figure 3B:
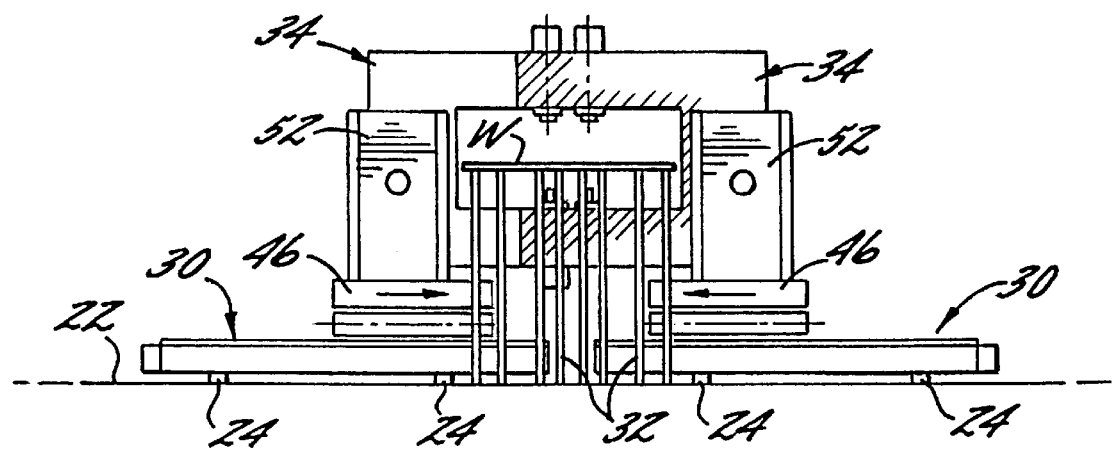

In embodiments of the present invention having at least one positioner 30 and C-frame 34 on each opposite edge of the workpiece, such as shown in FIG. 1A, it is advantageous for each C-frame 34 to be no longer than necessary to carry the tooling 42 across about half of the maximum width of a workpiece expected to be processed in the apparatus 20. This is best illustrated in FIGS. 2A–B and 3A–B. FIGS. 2A–B illustrate the apparatus 20 with a relatively narrow workpiece W installed therein. Accordingly, the C-frames 34 are longer than they need to be in order to reach all areas of the workpiece; that is, as illustrated by the positioner 30 on the right in FIG. 2A, all areas of the workpiece can be reached by only one of the C-frames, since its throat 40 is deep enough to accept substantially the entire width of the workpiece so that the tooling 42 can reach all the way across to the opposite edge of the workpiece. However, as shown in FIGS. 3A–B, the apparatus 20 is also designed to process wider workpieces W. Thus, as depicted in FIG. 3A, the C-frame on the right is able to carry its tooling 42 only about halfway across the width of the workpiece; this C-frame is used for accessing the nearer half-width of the workpiece. The other half-width of the workpiece is accessed by the opposite C-frame on the left in FIGS. 3A–B. The invention thereby allows the sizes of the C-frames 34 to be scaled down relative to the size that would be required in a conventional C-frame apparatus in which all areas of the workpiece are accessed by a C-frame disposed on only one side of the workpiece. The C-frames can therefore be made significantly lighter in weight, which allows the assembly apparatus 20 to be made faster because there is less inertia to overcome when accelerating the positioners 30.

Preferably, the positioners 30 on opposite sides of the workpiece can pass each other as they travel along the rails 24 in the X-axis direction. To facilitate passing, the C-frame 34 on at least one of the positioners can be retracted, such as depicted in FIG. 2A wherein the carriage 46 on the left-hand positioner has been retracted so that there is clearance between the opposing C-frames. Thus, each C-frame can work more or less independently of the other C-frame as it carries out its assigned work operations.

A significant feature of the present invention, at least in some embodiments thereof, is the ability to remove a C-frame from its positioner and replace it with a replacement C-frame, such that the removed C-frame can be serviced in an area that is remote from the positioner. Accordingly, the positioner does not have to be rendered inactive while personnel perform service on the C-frame, and the area of the assembly cell occupied by the positioner is not tied up while the service is being performed. To these ends, the assembly apparatus 20 in FIG. 1A includes a service station 60 for storing C-frames 34 and at which service operations can be performed on the C-frames stored therein. Such service operations may include, for example, maintenance work, tooling changes, quality assurance, and the like. The service station 60 advantageously can be located at one end of the bed 22. The apparatus 20 also includes a frame changer 70 that is operable to travel between the service station 60 and each positioner 30 wherever the positioner may be located during its operation. The frame changer 70 is operable to remove a C-frame 34 from a positioner 30, install a replacement C-frame 34 into the positioner, carry the removed C-frame back to the service station 60, and unload the removed C-frame at the service station 60 so that service operations can be performed on the C-frame. The frame changer 70 is further operable to pick up a C-frame from the service station 60 and carry it to a positioner so that the C-frame can be installed in the positioner.

The frame changer 70 advantageously can comprise an automated ground vehicle (AGV) whose movements are controlled by a cell controller 72 with the aid of suitable position sensors (not shown) for sensing the relative positions of the frame changer 70 and a positioner 30 that the frame changer is to interact with. The frame changer 70 can, for example, be guided by laser guidance devices (not shown). Once the frame changer 70 reaches a position generally proximate the positioner 30, additional sensors mounted on the frame changer and/or positioner can be used for fine-tuning the alignment between the frame changer and the positioner.

Figure 4:
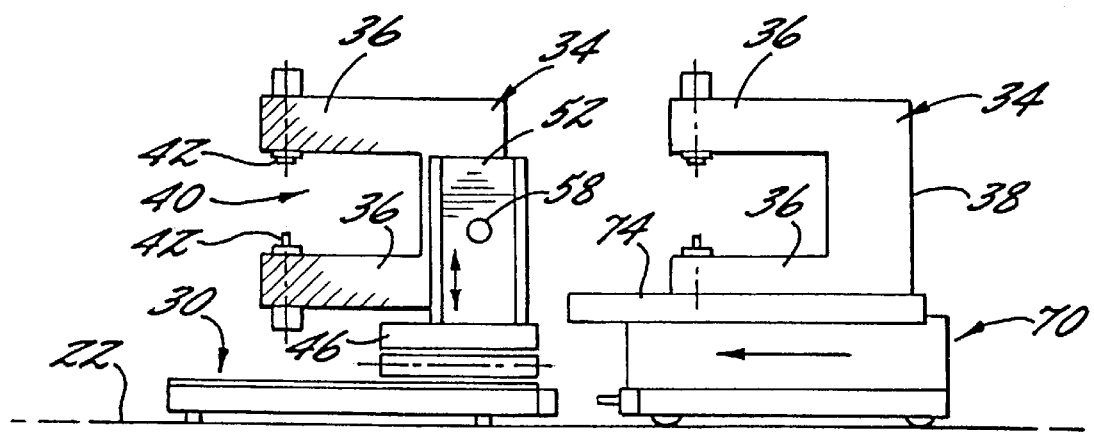
FIG. 4 is an end elevation of the assembly cell, showing a frame changer moving into position for changing a C-frame carried by a positioner of the assembly apparatus.

More particularly, and with reference to FIGS. 4 through 8, the cell controller 72 sends the frame changer 70 to a position generally aligned with the positioner 30 as shown in FIG. 4. The positioner 30 is commanded to place the C-frame in a predetermined position with respect to the platform 44 such that the bottom of the C-frame 34 is on a vertical level that matches that of an upper surface 74 of the frame changer onto which the C-frame 34 is to be transferred, and so that the C-frame 34 is oriented vertically as opposed to being tilted about either of the A- or B-axes. Next, the frame changer 70 is moved into proximity with the positioner 30 (e.g., within about 1 inch in the Y-axis direction), and a docking member 76 (FIG. 7), such as a draw bar, tapered pin, or the like, is used to draw the frame changer 70 up against the positioner 30 such that the frame changer and positioner are aligned and "docked" with each other to prevent relative movement therebetween during the process of transferring C-frames. The docking member 76 can be mounted on one of the positioner 30 and the frame changer 70 and can engage a receptacle 78 in the other. For aligning the docking member 76 with the receptacle 78, there preferably are position sensors 80 mounted on the positioner 30 and frame changer 70; the position sensors 80 can comprise proximity sensors that detect when the sensors on the positioner are aligned with those on the frame changer 70.

Figure 5:
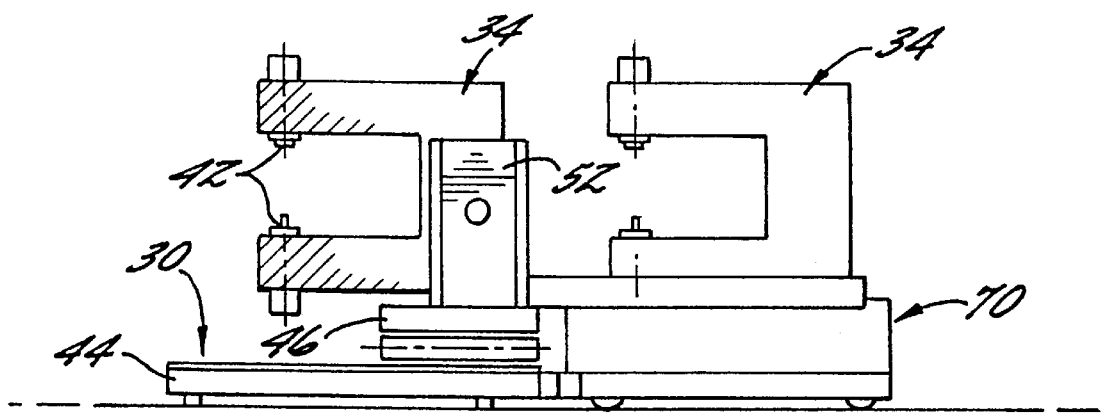
FIG. 5 is a view similar to FIG. 4, showing the frame changer docked with the positioner in preparation for changing the C-frame.
Figure 6:
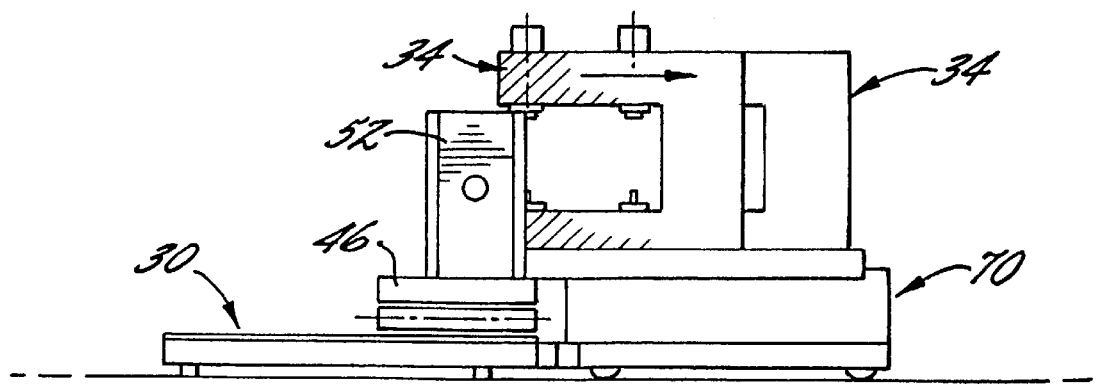
FIG. 6 is a view similar to FIGS. 4 and 5, showing the C-frame being transferred from the positioner onto the frame changer.

Once the frame changer 70 has been docked with the positioner 30 as shown in FIG. 5, the C-frame 34 is transferred from the positioner 30 onto the frame changer 70 by activating a transfer mechanism. The transfer mechanism can comprise a gear arrangement including drive gears and driven gears mounted on the positioner and frame changer, or vice versa, such that the driven gears are driven by the drive gears so as to move the C-frame between the positioner and the frame changer. The gear arrangement can include, for example, a pinion gear 82 rotatably mounted on the positioner 30, a similar pinion gear 84 rotatably mounted on the frame changer 70 in alignment with the pinion gear 82, a rack 86 attached to an underside of the C-frame 34 and in meshing engagement with the pinion gears, and roller bearings 88 mounted at the upper surfaces of the positioner 30 and frame changer 70. Thus, the pinion gear 82 on the positioner is rotated to cause the C-frame 34 to be translated along the roller bearings 88 onto the frame changer 70 so that the rack 86 is moved into engagement with the pinion gear 84 on the frame changer 70, as shown in FIG. 6. The pinion gear 84 is rotated to move the C-frame 34 fully onto the frame changer 70 so that it is freed from the positioner 30.

The frame changer 70 includes space for holding two C-frames spaced apart and parallel to each other, as depicted in FIG. 7. Each of the spaces for holding C-frames is equipped with the roller bearings 88 and a pinion gear 84. Accordingly, a replacement C-frame can be transferred from the frame changer 70 onto the now empty positioner so that the positioner can continue work operations on the workpiece. Thus, once the C-frame 34 has been removed from the positioner 30 onto the frame changer 70, the frame changer 70 is then undocked from the positioner 30 and is moved in the X-axis direction (or, equivalently, the positioner 30 is moved in the X-axis direction while the frame changer 70 remains in one place) so as to align a replacement C-frame carried by the frame changer 70 with the positioner. The frame changer 70 is then re-docked with the positioner, and the transfer mechanism is activated to transfer the replacement C-frame from the frame changer 70 onto the positioner 30. When the transfer is completed, the frame changer 70 is undocked from the positioner, and is then guided to carry the removed C-frame 34 to the service station 60. The removed C-frame 34 is unloaded to the service station; this can be carried out in a manner similar to that already described. Servicing of the C-frame can then be performed by personnel and, at the same time, the positioner 30 into which the replacement C-frame has been installed can be operated to continue work operations on a workpiece. The invention thus enables high assembly cell utilization rates and efficiency.

A further possible advantage of the invention is that each C-frame can be set up to install fasteners of one diameter that is different from the fastener diameters of the other C-frames. For example, one C-frame can be set up to install $3/16$-inch diameter rivets, a second to install $1/4$-inch diameter rivets, a third to install $5/16$-inch diameter rivets, and a fourth to install $3/8$-inch diameter rivets. This enables the design of a given C-frame riveter to be made simpler, since it does not have to be able to handle rivets of different sizes. Furthermore, by moving a C-frame to the service station for changing to a different fastener size, the other C-frames can resume work on the workpiece with minimal interruption. This is advantageous in the assembly of aircraft wing panels, for example, where it is common to use rivets of several different diameters on a given workpiece.

The frame changer's movements can be automatically controlled by the cell controller 72, as noted above. Alternatively, the actions of the frame changer 70 can be controlled by a human operator supplying commands to the frame changer, for example, by using a hand-held pendant or the like. Thus, the term "controller" as used herein is intended to refer to either an automated cell controller or a control device such as a hand-held pendant.

The efficiency of the overall assembly and maintenance processes can be further enhanced by providing the assembly tooling 42 in the form of removable end effectors that can readily and quickly be removed from the C-frame 34 and replaced with the same or different types of end effectors depending on the process requirements. Removable end effectors are known in the art for performing assembly operations such as riveting, tacking, installation of two-part fasteners, or other assembly operations, and their adaptation to the purposes of the present invention is within the skill of the ordinary worker in the art. The end effectors may also include part positioning and clamping elements for positioning a component part against a panel so that the part can be fastened to the panel. The end effectors advantageously can be controlled by numerical process control techniques, which can be implemented in the cell controller 72, so as to accurately position the component part in relation to the panel workpiece.

The description thus far has assumed that there is only one positioner 30 on each side of the workpiece-receiving area of the bed 22. However, as shown in FIGS. 1B and 1C, the invention is also applicable to assembly cells in which there are multiple positioners 30 on each side of the workpiece-receiving area. Furthermore, there can be more than one service station 60 and more than one frame changer 70 in the assembly cell. Thus, FIG. 1B shows an assembly cell in which there are two beds 22 arranged end-to-end. On the bed 22 on the left-hand side there are two positioners 30, one on each side, and a service station 60 at the end of the bed. On the other bed 22 there are four positioners 30, two on each side, and another service station 60 at the end of the bed. There are two frame changers 70, one on each side. Advantageously, one of the frame changers can be used for changing C-frames on one side of both beds, while the other frame changer is used for changing C-frames on the other side of both beds. However, various methods for apportioning the C-frame changing tasks among the frame changers 70 can be used within the scope of the invention.

Many modifications and other embodiments of the invention will come to mind to one skilled in the art to which this invention pertains having the benefit of the teachings presented in the foregoing descriptions and the associated drawings. For example, although the assembly apparatus 20 has been described as supporting a panel-shaped workpiece in a horizontal orientation and having positioners that travel along a horizontal bed, it should be recognized that there is nothing about the invention that renders it inapplicable to assembly machines employing positioners that travel along non-horizontal support surfaces. The workpiece in the illustrated embodiments is positioned with its width extending horizontally, but it is equally possible to position the workpiece in an inclined orientation. Furthermore, while C-frames have been illustrated and described herein, the invention can be practiced with tool-supporting frames of other shapes, as long as the tool-supporting frame enables the frame to be withdrawn away from the workpiece so that it can be removed by the frame changer. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for performing assembly operations on panel-shaped workpieces, comprising:

a bed defining a support surface extending along an X-axis, first and second parallel rails spaced apart a predetermined distance and extending parallel to the X-axis, and workpiece supports adapted to support one of the workpieces in a position spaced from the support surface with opposite first and second longitudinal edges of the one workpiece extending generally parallel to the X-axis and a width of the one workpiece extending generally parallel to a Y-axis orthogonal to the X-axis; and at least first and second positioners respectively supporting and positioning first and second C-frames each having a pair of spaced legs adapted to support tooling for operation upon the one workpiece when the one workpiece is positioned between the legs, each positioner comprising a platform operable to travel along one of the rails in a direction parallel to the X-axis and a carriage on which the respective C-frame is mounted and which is supported on the platform so as to be movable relative thereto, the first positioner being arranged to carry the first C-frame adjacent the first longitudinal edge of the one workpiece such that free ends of the legs extend toward the opposite second longitudinal edge of the one workpiece, the second positioner being arranged to carry the second C-frame adjacent the second longitudinal edge of the one workpiece such that free ends of the legs extend toward the first longitudinal edge of the one workpiece;

the legs of each C-frame having a length to carry the respective tooling across no more than about half of said predetermined distance between the rails whereby the tooling of each C-frame can reach no more than about halfway across a maximum width of the workpieces expected to be worked upon, the carriages and positioners being structured and arranged such that the positioners can pass by each other as they travel along the rails, wherein each C-frame is retained on the respective carriage by releasable retaining means for releasably retaining the C-frame which enables the C-frame to be readily removed for service.

2. The apparatus of claim 1, wherein the first C-frame carries riveting tooling operable to install rivets of a first diameter only, and the second C-frame carries riveting tooling operable to install rivets of a second diameter only, wherein the second diameter is different from the first diameter.

3. The apparatus of claim 1, further comprising removable end effectors removably supported on the legs of the C-frames for performing work operations on the workpieces.

4. The apparatus of claim 1, wherein each releasable retaining means comprises means for translating the respective C-frame off one side of the carriage so that the respective C-frame can be received and transported to a service area for service.

5. The apparatus of claim 4, wherein the means for translating comprises a gear arrangement including a drive gear in engagement with a driven gear that is driven by the drive gear to translate the C-frame off the carriage.

6. An apparatus for performing assembly operations on panel-shaped workpieces, comprising:

a bed defining a support surface extending along an X-axis, first and second parallel rails spaced apart a predetermined distance and extending parallel to the X-axis, and workpiece supports adapted to support at least one of the workpieces in a position spaced from the support surface with opposite first and second longitudinal edges of the at least one workpiece extending generally parallel to the X-axis and a width of the at least one workpiece extending generally parallel to a Y-axis orthogonal to the X-axis; and at least first and second positioners respectively supporting and positioning first and second C-frames each having a pair of spaced legs adapted to support tooling for operating upon the at least one workpiece when the at least one workpiece is positioned between the legs, each positioner comprising a platform operable to travel along one of the rails in a direction parallel to the X-axis and a carriage on which the respective C-frame is mounted and which is supported on the platform so as to be movable relative thereto, the first positioner being arranged to carry the first C-frame adjacent the first longitudinal edge of the at least one workpiece such that free ends of the legs extend toward the opposite second longitudinal edge of the at least one workpiece, the second positioner being arranged to carry the second C-frame adjacent the second longitudinal edge of the at least one workpiece such that free ends of the legs extend toward the first longitudinal edge of the at least one workpiece;

the legs of each C-frame having a length to carry the respective tooling across no more than about half of said predetermined distance between the rails whereby the tooling of each C-frame can reach no more than about halfway across a maximum width of each of the workpieces expected to be worked upon, the carriages and positioners being structured and arranged such that the positioners can pass by each other as they travel along the rails, wherein each C-frame is retained on the respective carriage by a releasable mechanism enabling the C-frame to be readily removed from the carriage for service, each releasable mechanism having means for translating the respective C-frame off one side of the carriage so that the respective C-frame can be received and transported to a service area for service.

7. The apparatus of claim 6, wherein the first C-frame carries riveting tooling operable to install rivets of a first diameter only, and the second C-frame carries riveting tooling operable to install rivets of a second diameter only, wherein the second diameter is different from the first diameter.

8. The apparatus of claim 6, further comprising removable end effectors removably supported on the legs of the C-frames for performing work operations on the at least one workpiece.

9. The apparatus of claim 6, wherein the means for translating comprises a gear arrangement including a drive gear in engagement with a driven gear that is driven by the drive gear to translate the C-frame off the carriage.

* * * * *